(12) United States Patent
Binnendijk et al.

(10) Patent No.: US 9,331,442 B2
(45) Date of Patent: May 3, 2016

(54) BUSBAR CONNECTION

(75) Inventors: Marten Binnendijk, Hengelo (NL);
Arend Lammers, Hengelo (NL)

(73) Assignee: EATON INDUSTRIES (NETHERLANDS) B.V., Hengelo (NL)

( * ) Notice: Subject to any disclaimer, the term of this patent is extended or adjusted under 35 U.S.C. 154(b) by 121 days.

(21) Appl. No.: 14/344,355

(22) PCT Filed: Sep. 12, 2012

(86) PCT No.: PCT/EP2012/067776
§ 371 (c)(1),
(2), (4) Date: Jul. 3, 2014

(87) PCT Pub. No.: WO2013/037798
PCT Pub. Date: Mar. 21, 2013

(65) Prior Publication Data
US 2014/0342586 A1 Nov. 20, 2014

(30) Foreign Application Priority Data
Sep. 12, 2011 (EP) .................... 11180845

(51) Int. Cl.
*H01R 25/00* (2006.01)
*H01R 25/16* (2006.01)
*H02G 5/00* (2006.01)
*H01R 13/6581* (2011.01)
*H02B 13/00* (2006.01)
*H02G 5/06* (2006.01)

(52) U.S. Cl.
CPC .......... *H01R 25/162* (2013.01); *H01R 13/6581* (2013.01); *H02G 5/007* (2013.01); *H02B 13/005* (2013.01); *H02G 5/06* (2013.01)

(58) Field of Classification Search
CPC .......... H02G 5/007; H02G 5/08; H02G 5/06; H01R 25/14; H01R 25/145

USPC .................. 439/213, 115; 174/84 R, 88 B
See application file for complete search history.

(56) References Cited

U.S. PATENT DOCUMENTS

| | | | | |
|---|---|---|---|---|
| 4,262,163 A | * | 4/1981 | Durrell | H02G 5/005 174/33 |
| 4,757,160 A | | 7/1988 | Lorenz et al. | |
| 5,594,212 A | * | 1/1997 | Nourry | H02G 3/00 174/84 R |
| 5,614,697 A | * | 3/1997 | Jego | H01R 4/70 174/84 R |
| 5,760,339 A | * | 6/1998 | Faulkner | H01R 25/162 174/88 B |
| 6,521,837 B2 | * | 2/2003 | Hilgert | H02G 3/0608 174/149 B |

FOREIGN PATENT DOCUMENTS

| | | |
|---|---|---|
| DE | 2707592 A1 | 8/1978 |
| EP | 0175637 A1 | 3/1986 |
| EP | 0209384 A2 | 1/1987 |
| EP | 0789424 A2 | 8/1997 |
| EP | 1975949 A1 | 10/2008 |
| JP | 9308023 A | 11/1997 |
| JP | 2009261215 A | 11/2009 |

\* cited by examiner

*Primary Examiner* — Hien Vu
(74) *Attorney, Agent, or Firm* — Leydig, Voit & Mayer, Ltd.

(57) ABSTRACT

A busbar connection includes first and second busbars each with a free end, and a shield device. The free ends of the busbars are directed towards each other and are in electrical contact with each other. The shield device envelopes the free ends of the busbars and is configured to steer the electrical field. The shield device includes a body of electrical conducting material. The body has two oppositely arranged contact surfaces in direct electrical contact with the free ends of the busbars. The body has a flange surrounding the contact surfaces and providing an upright edge around the contact surfaces.

4 Claims, 2 Drawing Sheets

BUSBAR CONNECTION

CROSS-REFERENCE TO PRIOR APPLICATIONS

This application is a U.S. National Phase Application under 35 U.S.C. §371 of International Application No. PCT/EP2012/067776, filed on Sep. 12, 2012, and claims benefit to European Patent Application No. EP 11180845.7, filed on Sep. 12, 2011. The International Application was published in English on Mar. 21, 2013 as WO 2013/037798 A1 under PCT Article 21(2).

FIELD

The invention relates to a busbar connection.

BACKGROUND

Busbars are used in electrical power distribution and particularly for distributing the electrical power to electrical switches that connect to subnets.

In case of medium to high voltage applications, with voltages of 1 kV and higher, two busbars cannot simply be connected to each other. The medium to high voltages generate an electrical field in between the busbars and in between the busbars and the earthed cabinet. The density of this electrical field should be kept as low as possible and under the acceptable limits, as otherwise flashover can occur. As a result any transition in a busbar and thus in any connection is currently made as fluent as possible to avoid areas of high field density.

Busbars are for example used in switchgear for connecting subnets to a main power supply. Switchgear typically has a housing through which three busbars run, one for each phase. Within each housing suitable switches are arranged for connecting or disconnection a panel of a subnet to the busbars.

In JP 2009 261215 a connector for connecting two conductor ends is described. An insulator body is arranged around the conductor ends and a vessel filled with a gas is enveloping the elements. EP 0175637 discloses an electrically conducting shield having a tubular shape. Both ends of the conductors are inserted into the shield and tightened by screws. EP 0789424 discloses a specific connector for conductors, which are provided with longitudinal grooves. The connector itself is provided with inner grooves to provide an electrically conducting connection between the connector and the conductor. A housing is furthermore arranged around the connector and the conductor ends, which housing could be filed with a gas. JP 9308023 discloses a connector for two conductors. The conductor ends are provided with flanges which are bolted together and a tubular shield is arranged around the connector. DE 2707592 relates to a connector which allows for misalignment of the conductor ends. The connector is a tubular element having two eccentric holes. By rotating the tubular element, the misalignment can be taken care of.

Because usually several subnets are connected to a main power supply, a number of panels are positioned next to each other and the busbars connect the adjacent panels to each other. In order to have a fluent and neat connection of the busbars of adjacent panels, the housings are aligned and set to height, such that the busbars are aligned as good as possible. Then the busbars are connected to each other by for example bolting a conductor to both free ends of aligned busbars.

Typically, when connecting busbars to each other, the free ends of the busbars are provided with large radii to ensure, that even if a small misalignment of the busbars occurs, the transition from one busbar to a next busbar is as fluent as possible avoiding areas of high electrical field density. To provide the large radii, the busbar free end has to be machined. This is a costly manufacturing step.

The alignment of the switchgear and the machining of the busbars to provide the required radii, take time and effort, resulting in high costs.

SUMMARY

In an embodiment, the present invention provides a busbar connection including first and second busbars each with a free end, and a shield device. The free ends of the busbars are directed towards each other and are in electrical contact with each other. The shield device envelopes the free ends of the busbars and is configured to steer the electrical field. The shield device includes a body of electrical conducting material. The body has two oppositely arranged contact surfaces in direct electrical contact with the free ends of the busbars. The body has a flange surrounding the contact surfaces and providing an upright edge around the contact surfaces.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
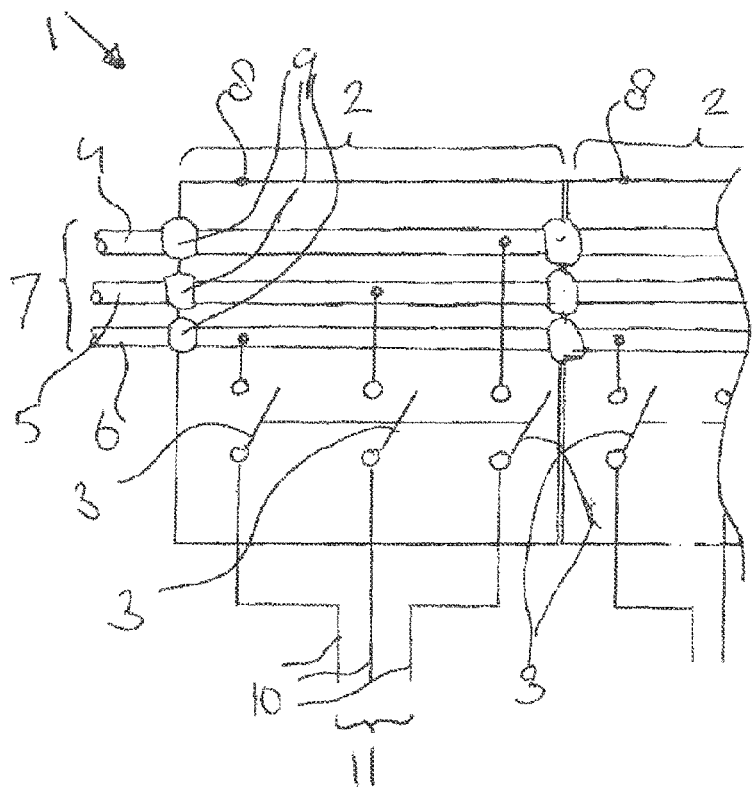
FIG. 1 shows a schematic view of switchgear with busbar connections according to an embodiment of the invention.

In an embodiment, the present invention provides a busbar connection in which the above mentioned disadvantages are reduced or even prevented.

With the busbar connection according to an embodiment of the invention it is possible to provide a connection between two busbars, without having to align the busbars and without having to provide the free ends of the busbars with special radii. The shield device ensures that any concentrations of field lines are smoothed out such that the peak values of the electrical fields are reduced.

If two busbars are misaligned, there would generally be at least one spot with a high field density near the transition from one busbar to the other. Without any measures this would substantially increase the risk of flashover. However, according to an embodiment of the invention, a shield device is provided enveloping the free ends of the busbars and thus also enveloping the at least one spot with a high field density. The shield device controls the electrical field, such that the at least one spot of high field density is smoothed out.

According to an embodiment of the invention the shield device comprises a body of electrical conducting material, said body having two oppositely arranged contact surfaces for direct electrical contact with the free ends of the busbars and said body having a flange surrounding the contact surfaces and providing an upright edge around the contact surfaces.

The body of electrical conducting material can also be manufactured separately and positioned between the free ends of two busbars during assembly. The body has a further advantage, that possible air gaps between the body and the busbars, do not substantially influence the shielding properties.

In a preferred embodiment of the busbar connection according to the invention the shield device is substantially centered relative to the transition zone between both free ends of the first and second busbars.

By having the shield device substantially centered relative to the transition zone, the shield device will equally envelope the free end of the first busbar and the free end of the second busbar. The transition zone is considered the zone at which the free end of the first busbar ends and where the free end of the second busbar starts.

In another preferred embodiment of a busbar connection according to the invention, the shield device comprises a ring of insulation material, running around the free ends of the busbars. An insulation material has good electrical permittivity properties that smoothen out and reduce the electrical fields concentrations. By providing a ring of such an insulation material around the free ends of the busbars, a reliable shield is provided.

Yet another embodiment of the busbar connection according to the invention comprises a disc of electrical conducting material positioned between and in direct contact with the free ends of the first and second busbar, wherein the ring of insulation material is arranged on the edge of the disc.

Such a disc with a surrounding ring of insulation material can easily be made separately and be positioned between the free ends of two busbars during assembly.

Preferably, the flange has a convex surface extending between the first and second busbar. The convex surface on the flange steers the field lines and directs them from the first busbar to the second busbar.

Yet another embodiment of the busbar connection according to the invention includes a connection plate for connection the first busbar with the second busbar, the connection plate being bolted to both busbars. The connection plate provides a mechanical connection between the two busbars and ensures that the electrical contact will be present at all times.

FIG. 1 shows a schematic view of switchgear 1 as typically used in medium to high voltage applications. The switchgear has two panels 2, with each three switches 3 arranged in a housing 8.

Three busbars 4, 5, 6 run through each housing 8 and have a busbar connection 9 at each transition from one housing 8 to the next housing 8. Each switch 3 of a panel 2 connects one of the busbars 4, 5, 6 to one of the lines 10 of a subnet 11 to be able to switch a subnet 11 on to or off from the main power supply 7.

Figure 2:
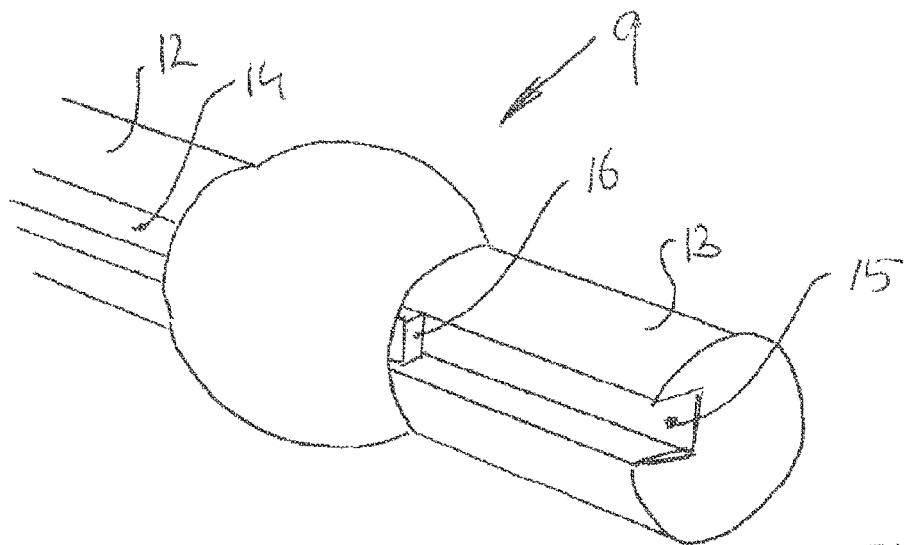
FIG. 2 shows the busbar connection of FIG. 1 in perspective view.

FIG. 2 shows a perspective view of a busbar connection according to the invention. Two busbar parts 12, 13 are positioned abbutingly, but not necessarily aligned. Each busbar part 12, 13 is provided with a groove 14, 15, in which a conductor 16 is housed. The conductor 16 ensures a firm connection between the two busbar parts 12, 13. (See also FIG. 3).

Figure 3:
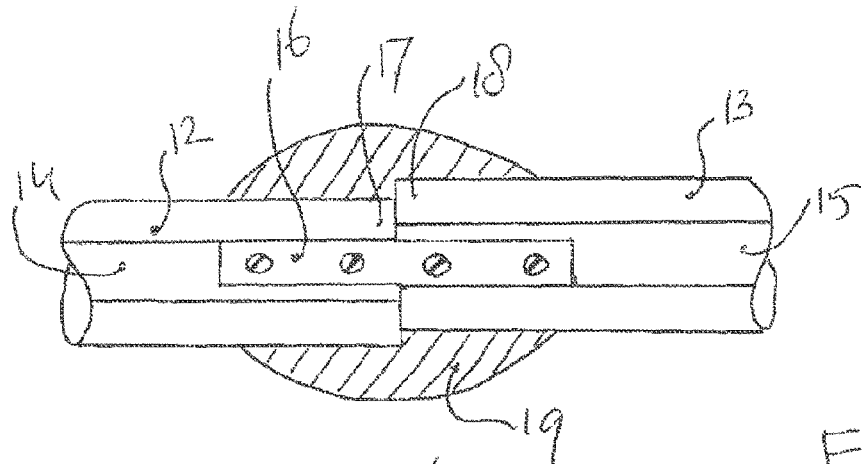
FIG. 3 shows a cross sectional view of the busbar connection of FIG. 1.

The free ends 17, 18 of the busbar parts 12, 13 respectively are shown misaligned in FIG. 3 in an exaggerated way. To ensure that the increased field density as a result of the misalignment does not increase the chance of flashover, a shield 19 is arranged around and enveloping the free ends 17, 18. In this embodiment, the shield 19 is preferably of a non conducting plastic, which steers the electric field around the free ends 17, 18 and smoothes out the spots of high field density.

Figure 4:
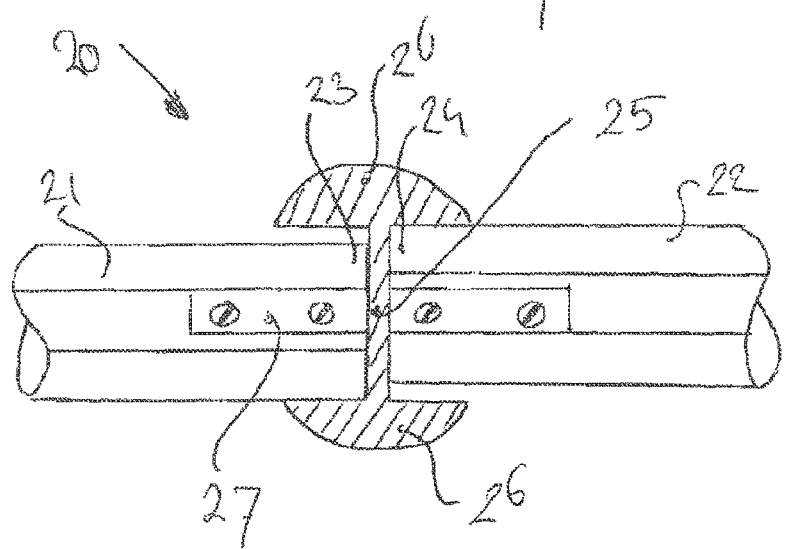
FIG. 4 shows a cross sectional view of a second embodiment of a busbar connection according to the invention.

FIG. 4 shows a second embodiment of a busbar connection 20 according to the invention. In this embodiment, two busbar parts 21, 22 with free ends 23, 24 respectively are positioned adjacently. A shield device 25, 26 is placed in between the free ends 23, 24 and fills the gap between the free ends 23, 24.

The shield device 25, 26 has a web 25, which is in direct contact with the end faces of the free ends 23, 24. The shield device 25, 26 further has a flange 26 with a concave outer surface. Due to the shape of the flange 26, the electric field in the busbar parts 21, 22 is steered, such that the chance on flashover is substantially reduced.

Furthermore, the busbar parts 21, 22 are connected by a connection plate 27, which could run through the web 25 or could be attached thereto.

Figure 5:
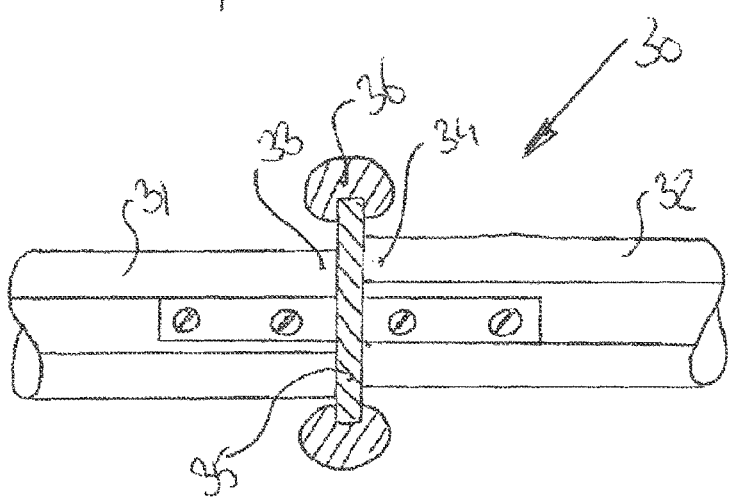
FIG. 5 shows a cross sectional view of a third embodiment of a busbar connection according to the invention.

FIG. 5 shows a cross sectional view of a third embodiment 30 of a busbar connection according to the invention. The busbar connection 30 connects two busbar parts 31, 32. These busbar parts 31, 32 need not to be aligned.

In between the free ends 33, 34 of the busbar parts 31, 32 respectively a disc 35 of conducting material is arranged. A ring 36 of non conducting material, preferably a plastic, is arranged at the edge of the disc 35.

In this embodiment, the electric field of a busbar part 31, 32 is directed into the disc 35 and flows towards the edge of the disc. By arranging the ring 36 of preferably non conducting material, any concentration of electric fields is steered and smoothed out.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electrical busbar connection comprising:
   first and second busbars each with a free end, wherein the free ends of the busbars are directed towards each other and are in electrical contact with each other; and
   a shield device enveloping the free ends of the busbars and being configured to steer the electrical field, the shield device including a body of electrical conducting material, the body having two oppositely arranged contact surfaces in direct electrical contact with the free ends of the busbars and the body having a flange surrounding the contact surfaces and providing an upright edge around the contact surfaces' wherein the shield device includes a ring of insulation material running around and spaced away from the free ends of the busbars, and wherein the shield device includes a disc of electrical conducting material positioned between and in direct contact with the free ends of the busbars, the disc having an edge, wherein the ring of insulation material is arranged on the edge of the disc.

2. The electrical busbar connection according to claim 1, wherein the shield device is substantially centered relative to a transition zone between both free ends of the first and second busbars.

3. The electrical busbar connection according to claim 1, wherein the flange has a convex surface extending between the first and second busbar.

4. The electrical busbar connection according to claim 1, further comprising a connection plate bolted to each of the busbars so as to connect the first busbar with the second busbar.

\* \* \* \* \*